(12) United States Patent
Suzuki et al.

(10) Patent No.: US 7,936,926 B2
(45) Date of Patent: May 3, 2011

(54) APPARATUS, METHOD, AND PROGRAM FOR FACE FEATURE POINT DETECTION

(75) Inventors: Tomoharu Suzuki, Anjo (JP); Jun Adachi, Obu (JP); Yukihiko Yoshinaga, Kariya (JP); Yuji Ninagawa, Nishikamo-gun (JP); Kenichi Ohue, Toyota (JP); Kentaro Takahashi, Toyota (JP); Shigeyasu Uozumi, Toyota (JP); Shinichi Kojima, Nisshin (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 618 days.

(21) Appl. No.: 12/046,724

(22) Filed: Mar. 12, 2008

(65) Prior Publication Data

US 2008/0226175 A1 Sep. 18, 2008

(30) Foreign Application Priority Data

Mar. 13, 2007 (JP) ................... 2007-063149

(51) Int. Cl.
*G06K 9/00* (2006.01)
*G06K 9/46* (2006.01)
(52) U.S. Cl. ........................ 382/190; 382/117
(58) Field of Classification Search ............. 382/103, 382/115, 117, 118, 181, 190; 340/435; 600/595
See application file for complete search history.

(56) References Cited

U.S. PATENT DOCUMENTS

| | | | | |
|---|---|---|---|---|
| 5,680,481 A | * | 10/1997 | Prasad et al. | 382/190 |
| 5,729,619 A | * | 3/1998 | Puma | 382/115 |
| 5,781,650 A | * | 7/1998 | Lobo et al. | 382/118 |
| 7,486,801 B2 | * | 2/2009 | Suzuki et al. | 382/103 |
| 2005/0286799 A1 | | 12/2005 | Huang et al. | |
| 2006/0045317 A1 | | 3/2006 | Adachi et al. | |
| 2006/0074653 A1 | | 4/2006 | Mitari et al. | |
| 2006/0188130 A1 | | 8/2006 | Park et al. | |

FOREIGN PATENT DOCUMENTS

JP          03-202045          9/1991

(Continued)

OTHER PUBLICATIONS

English Abstract of JP2005-025568, Published on Jan. 27, 2005, one page.*

(Continued)

*Primary Examiner* — Duy M Dang
(74) *Attorney, Agent, or Firm* — Sughrue Mion, PLLC

(57) ABSTRACT

A face feature point detection apparatus includes an image capturing device, an edge calculating unit calculating edge values indicating a luminance change in a direction, and a detection target determining unit scanning an edge image, which is created by arranging the edge values for corresponding pixels based on pixel arrangement of the face images, with an image window being an aggregation of selected pixels formed in a predetermined shape, the detection target determining unit determining a position of the image window having a largest weighted sum of weighted sums to be a detection position where a detection target is present, providing that the weighted sum is calculated by multiplying the edge value which corresponds to each pixel in the image window by a predetermined value defined on a per-pixel basis and adding up all products of the edge value and the predetermined value.

9 Claims, 15 Drawing Sheets

FOREIGN PATENT DOCUMENTS

| | | | |
|---|---|---|---|
| JP | 07-181012 | A | 7/1995 |
| JP | 07-313459 | A | 12/1995 |
| JP | 8-101915 | A | 4/1996 |
| JP | 10-044824 | A | 2/1998 |
| JP | 10-63850 | A | 3/1998 |
| JP | 11-066320 | A | 3/1999 |
| JP | 2000-067225 | A | 3/2000 |
| JP | 2000-123188 | A | 4/2000 |
| JP | 2000-137792 | A | 5/2000 |
| JP | 2001-137792 | A | 5/2000 |
| JP | 2000-339457 | A | 12/2000 |
| JP | 3143819 | B2 | 1/2001 |
| JP | 2001-307076 | A | 11/2001 |
| JP | 3444115 | B2 | 6/2003 |
| JP | 2005-25568 | A | 1/2005 |
| JP | 3312562 | B2 | 5/2005 |
| JP | 2005-296349 | A | 10/2005 |
| JP | 2006-065673 | A | 3/2006 |
| WO | 2005/059811 | A1 | 6/2005 |

OTHER PUBLICATIONS

English Abstract of JP2006-065673, Published on Mar. 9, 2006, one page.*

Japanese Office Action dated Feb. 3, 2009, with translation (14 pages).

Song, Xinguang, "Extraction of Facial Organ Features Using Partial Feature Template and Global Constraints," The IEICE Transactions of Institute of Information and Communication Engineers, Aug. 25, 1994, J77-D-II No. 8, pp. 1601-1609.

Japanese Office Action issued in JP 2007-071524 dated Jan. 20, 2009 (10 pages).

International Search Report issued in PCT/JP2007/073311 dated Dec. 25, 2007 (3 pages).

European Patent Office Search Report issued in EP Application No. 08 15 2639 dated Aug. 30, 2010 (7 pages).

Yang, M. H. et al, "Face Detection and Gesture Recognition for Human-Computer Interaction", Kluwer Academic Publishers, Norwell, Massachusetts, Jan. 1, 2001, pp. 23-26, XP002597039, ISBN: 978-0-7923-7409-1.

* cited by examiner

FIG. 7A

Operator for horizontal edge detection

| 1 | 0 | -1 |
|---|---|----|
| 2 | 0 | -2 |
| 1 | 0 | -1 |

Operator for vertical edge detection

| 1 | 2 | 1 |
|---|---|---|
| 0 | 0 | 0 |
| −1 | −2 | −1 |

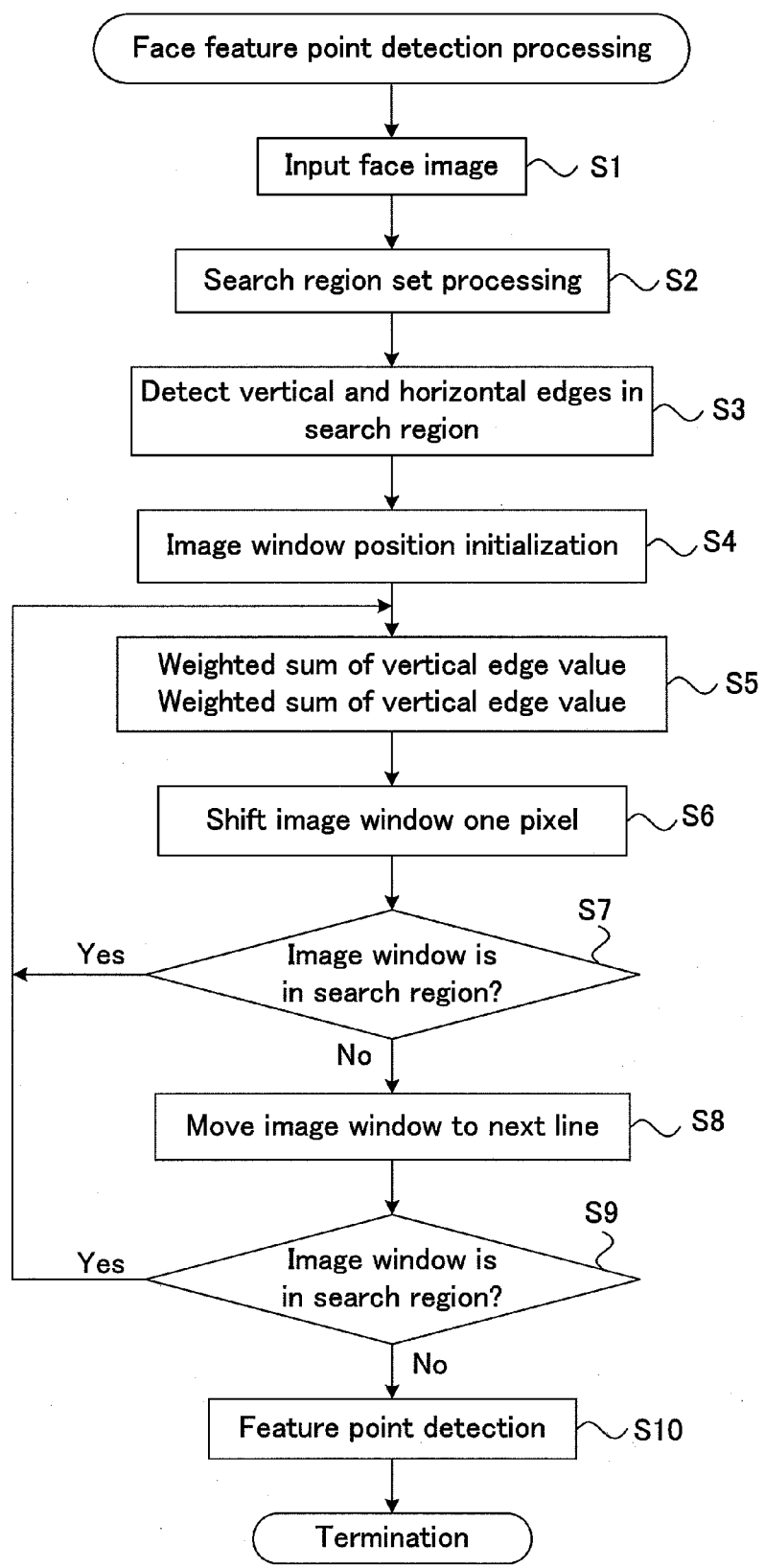

APPARATUS, METHOD, AND PROGRAM FOR FACE FEATURE POINT DETECTION

CROSS REFERENCE TO RELATED APPLICATIONS

This application is based on and claims priority under 35 U.S.C §119 with respect to Japanese Patent Application 2007-063149, filed on Mar. 13, 2007, the entire content of which is incorporated herein by reference.

FIELD OF THE INVENTION

This invention relates to an apparatus, a method and a program for detecting a predetermined feature in a face image.

BACKGROUND

A technique that determines the state of eyes based on a face image for monitoring the direction of gaze of a person and presuming his/her arousal level is known. In order to determine the state of the eyes, the eyes should be detected accurately in the face image. Further, when determining the driver's state, a face feature point should be detected in real-time.

For example, a technique that extracts a driver's eye position to detect lowering of the arousal level is disclosed in JP 7-181012A. In the process using the technique, an eye presence region is set in a first image frame. Width and length of a region where an eye is present is determined based on a center position of each eye. Then, mask processing is performed from the next frame using the eye presence region, and the eye is extracted as a label which is not in contact with the frame of the eye presence region. Follow-up conducted in the eye presence region limits an extraction range, thereby conducting the extraction at high speeds.

Further, a technique for suppressing influence of lighting conditions or individual differences in facial structure and the like in eye blinking detection is disclosed in JP 7-313459A. The technique disclosed in JP 7-313459A calculates a point P whose edge value is a positive local maximum point and a point M whose edge value is a negative local minimum point (the absolute value of the point M is large) in a one dimensional edge image. Then, initial positions of the search, i.e. points P0 and M0, are determined. The search is conducted to detect extreme points located at an outer side from each initial position and the respective search regions are set accordingly. Hence, the search proceeds upward for detecting the positive extreme points and proceeds downward for detecting the negative extreme points. Then, the check is conducted to determine whether a sign of the edge value is inverted in the search region. The edge value is negative between the point M0 and the point M1. Thus, the points P1 and M1 are set as new initial positions and the search is iteratively conducted. No other edge extreme point exists at an upper side of the point P1 and a lower side of the point M1. Hence, the point P1 is set as boundary point A and the point M1 is set as boundary point B. A distance between the boundary point A and the boundary point B is measured to be output as an opening degree of an eyelid.

In the technique disclosed in JP 7-181012A, the mask processing and labeling are performed on a predetermined region, which is not in contact with a subject to be extracted, in a binarized image. However, when using the technique that binarizes the image, the feature point of the subject may not be accurately detected due to the lighting conditions and the individual differences in the facial structure.

Further, the technique disclosed in JP 7-313459A, candidates for the subject to be detected, are extracted from the extreme points on plural base lines. The extraction is conducted based on the extreme values indicating gray level change in the one dimensional edge image. Thus, when detecting an eye, moles and the like are erroneously extracted as the candidates, and the detection result is subject to the influence of the individual differences in the facial structure.

A need thus exists to provide an eye detection apparatus which is not susceptible to the drawback mentioned above.

SUMMARY OF THE INVENTION

According to an aspect of the present invention, a face feature point detection apparatus includes an image capturing devices capturing a face image, an edge calculating unit calculating edge values, each edge value indicating a luminance change in a direction, in the face image, and a detection target determining unit scanning an edge image, which is created by arranging the edge values for corresponding pixels calculated by the edge calculating unit based on pixel arrangement of the face image, with an image window, the image window being an aggregation of selected pixels formed in a predetermined shape, the detection target determining unit determining a position of the image window having a largest weighted sum of weighted sums to be a detection position where a detection target is present, providing that the weighted sum is calculated by multiplying the edge value which corresponds to each pixel in the image window by a predetermined value defined on a per-pixel basis and adding up all products of the edge value and the predetermined value.

According to a second aspect of the present invention, a face feature point detection method includes an edge calculating step calculating edge values, each edge value indicating a luminance change in a direction, in a face image, and a detection target determining step scanning an edge image, which is created by arranging the edge values for corresponding pixels calculated by the edge calculating step based on pixel arrangement of the face image, with an image window, the image window being an aggregation of selected pixels formed in a predetermined shape, the detection target determining step determining a position of the image window having a largest weighted sum of weighted sums to be a detection position where a detection target is present, providing that the weighted sum is calculated by multiplying the edge value which corresponds to each pixel in the image window by a predetermined value defined on a per-pixel basis and adding up all products of Me edge value and the predetermined value.

According to a third aspect of the present invention, a program instructing a computer to function as an edge calculating unit calculating edge values, each edge value indicating a luminance change in a direction, in an face image, and a detection target determining unit scanning an edge image, which is created by arranging the edge values for corresponding pixels calculated by the edge calculating unit based on pixel arrangement of the face image, with an image widow, the image window is an aggregation of selected pixels formed in a predetermined shape, the detection target determining unit determining a position of the image window having a largest weighted su of weighted sums to be a detection position where a detection target is present, providing that the weighted sum is calculated by multiplying the edge value which corresponds to each pixel in the image window by a predetermined value defined on a per-pixel basis and adding up all products of the edge value and the predetermined value.

BRIEF DESCRIPTION OF THE DRAWINGS

The foregoing and additional features and characteristics of the present invention will become more apparent from the following detailed description considered with reference to the accompanying drawings, wherein:

FIG. 7A is a diagram showing an example of an operator for longitudinal edge detection;

FIG. 17 is a flowchart showing an example of an operation of face feature point detection processing.

DETAILED DESCRIPTION

Figure 1:
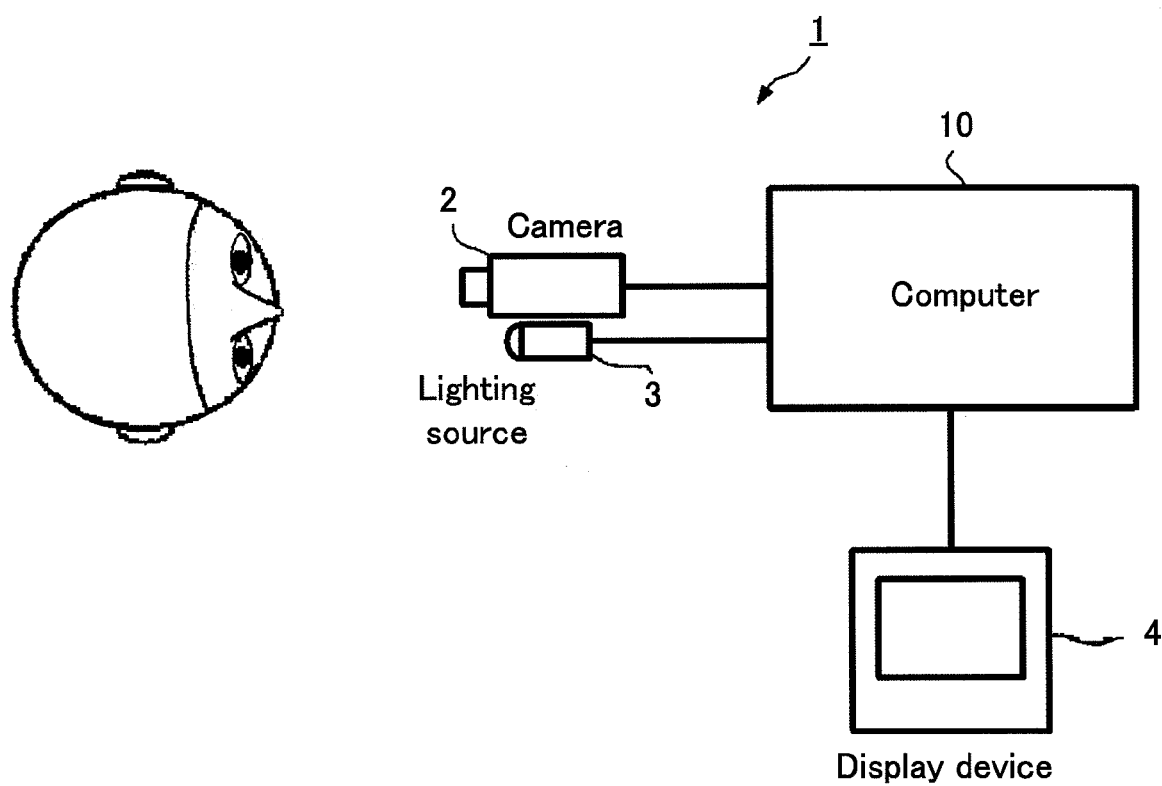
FIG. 1 is a block diagram of an eye detection apparatus according to an embodiment of the present invention.

Hereinafter, an embodiment of the invention is described in detail with drawings. Identical reference numbers are assigned to identical or corresponding portions in the drawings, and the description is not repeated. FIG. 1 is a block diagram showing a configuration of an eye detection apparatus 1 according to the embodiment of the invention. The eye detection apparatus 1 of the embodiment is comprised of a camera 2 (image capturing means), a lighting source 3 lighting a driver's face, a computer 10 and a display device 4 connected to the computer 10. The camera 2 captures images of the driver's face to create the face images and the computer 10 detects eyes of the driver. The display device 4 is not an essential component and the system does not need the display device 4 unless it is necessary to display the face images, the detection result, the determination results or the like.

The camera 2 converts an image formed by a lens into an electric signal by using a device such as Charge Coupled Device (CCD), and then the camera 2 outputs an image data digitalized on a per-pixel basis. Further, the camera 2 creates, for example, a grayscale image of the driver's face. The image data created by the camera 2 includes not only the driver's face but also a background image behind the driver.

The display device 4, comprised of a Liquid Crystal Display (LCD), a Cathode Ray Tube (CRT), or the like, displays binarized images created based on the face images captured by the camera 2 and the like.

The computer 10 processes the image data captured by the camera 2, and then detects right and left ends of the driver's face in a width direction of the face image, and further detects upper and lower portions of the driver's face in a longitudinal direction of the face image. Then, the computer 10 sets a region (an eye search region) from which the eyes are searched based on the right and left ends and the upper and lower portions of the face image detected as described above, and detects upper and lower eyelids of the driver's face within the eye search region.

Figure 2:
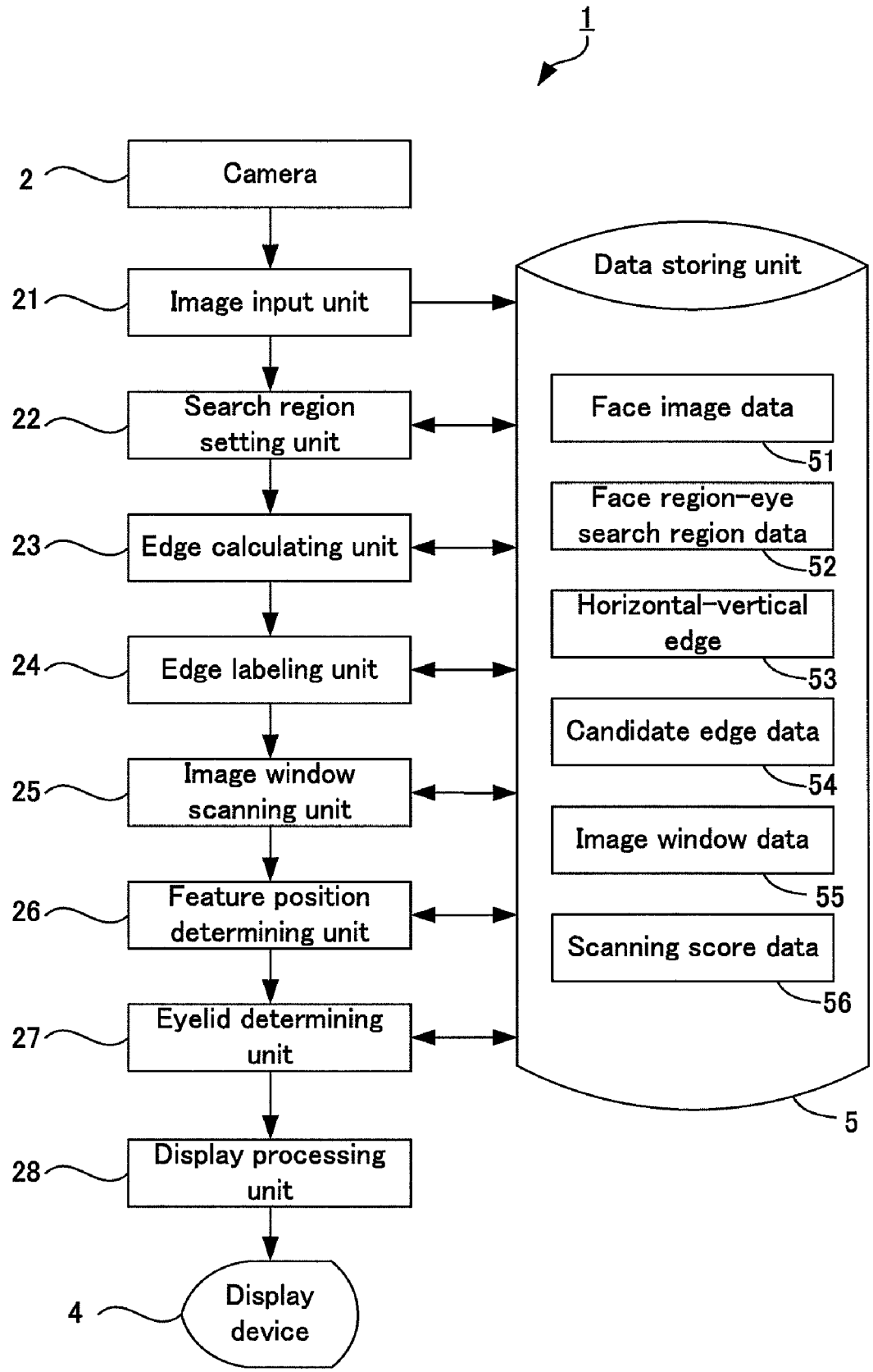
FIG. 2 is a block diagram showing logical structure of the eye detection apparatus according to the embodiment of the present invention.

FIG. 2 is a block diagram illustrating logical structure of the eye detection apparatus 1 of the embodiment. The eye detection apparatus 1 includes the camera 2, an image input unit 21, an eye search region setting unit 22, an edge calculating unit 23 (edge calculating means), an edge labeling unit 24 (noise removing means) an image window scanning unit 25, a feature position determining unit 26, an eyelid determining unit 27, a display processing unit 28, a data storing unit 5, the display device 4, and the like. Face image data 51, face region-eye search region data 52, horizontal-vertical edge data 53, candidate edge data 54, image window data 55 and scanning score data 56 are stored in the data storing unit 5. The eye detection apparatus 1 detects two pairs of the upper and the lower eyelids in the face image.

Figure 3:
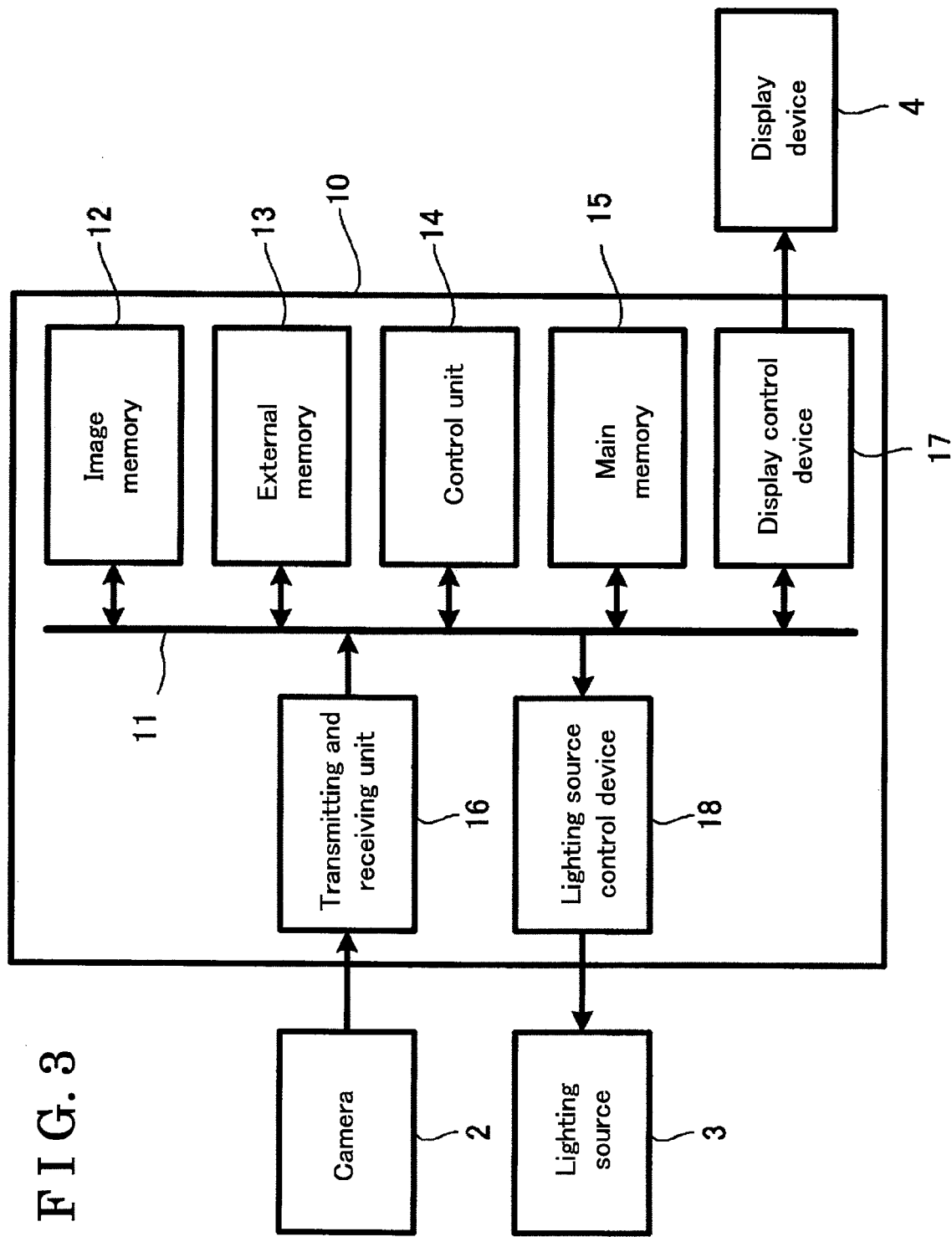
FIG. 3 is a block diagram showing structure of a computer shown in FIG. 1.

FIG. 3 is a block diagram illustrating an example of a physical configuration of the eye detection apparatus 1. As shown in FIG. 3, the computer 10 includes a transmitting and receiving unit 16, an image memory 12, an external memory 13, a control unit 14 (detection target determining means), a main memory 15, a display control device 17, and a lighting source control device 18. The image memory 12, the external memory 13, the main memory 15, the transmitting and receiving unit 16, the display control device 17 and the lighting source control device 18 are respectively connected to the control unit 14 via internal buses 11.

The control unit 14 is comprised of a Central Processing Unit (hereinafter referred to as CPU) and the like. The control unit 14 executes the processing for the image input unit 21, the eye search region setting unit 22, the edge calculating unit 23, the edge labeling unit 24, the image window scanning unit 25, the feature position determining unit 26, the eyelid determining unit 27, and the display processing unit 28 by following commands programmed in the external memory 13. The control unit 14 and programs executed by the control unit 14 performs the processing for the image input unit 21, the eye searching region setting unit 22, the edge calculating unit 23, the edge labeling unit 24, the image window scanning unit 25, the feature position determining unit 26, the eyelid determining unit 27, and the display processing unit 28.

The main memory 15 is comprised of a Random-Access Memory (RAM) and the like and serves as a working area of the control unit 14. The data storing unit 5 is stored as the structure of the memory region in a part of the image memory 12 and the main memory 15.

The external memory 13 is comprised of nonvolatile memories, such as a flash memory, a hard disk, a Digital Versatile Disc (DVD), a Digital Versatile Disc Random-Access Memory (DVD-RAM), a Digital Versatile Disc ReWritable (DVD-RW) or the like. The external memory 13 prestores the programs for the control portion 14 to execute the above-mentioned processing. Further, the external memory 13 supplies the data from each program to the control portion 14 in response to the commands from the control unit 14 and stores the data supplied from the control portion 14. For example, time-series image data may be stored in the external memory 13.

When a network is utilized to for the eye detection apparatus 1, the transmitting and receiving unit 16 is comprised of one of a Modulator-demodulator, a network terminator and either one of a serial interface or a Local Area Network interface (LAN interface) that is connected to either one of the Modulator-demodulator or the network terminator. On the other hand, when the camera 2 is directly connected to the computer 10, the transmitting and receiving unit 16 is comprised of, for example, a National Television Standard Committee interface (NTSC interface). The control unit 14 inputs the image data from the camera 2 via the transmitting and receiving unit 16. The image memory 12 stores the image data that is created by the camera 2 and is input via the transmitting and receiving unit 16.

The display control device 17 controls the display device 4 under the control of the control unit 14. The lighting source control unit 18 controls the lighting source 3 to be turned on or turned off.

The control unit 14 executes the programs stored in the external memory 13, thereby processing the image data captured by the camera 2 to detect the left and right ends and the upper and lower portions of the face. Then, the control unit 14 sets the eye search region based on the detection result of the left and right ends, and the upper and lower portions of the face. Then, the control unit 14 detects edges, indicating luminance change in horizontal and vertical directions of the image, in the eye search region to detect the upper and lower eyelids from the edge data.

Returning to FIG. 2, an operation of each unit of the eye detection apparatus 1 will be described. The camera 2 captures the face images. The image input unit 21 inputs the time-series image data from the camera 2 at predetermined time intervals and stores the time-series images as the face image data 51 in the data storing unit 5.

Figure 4:
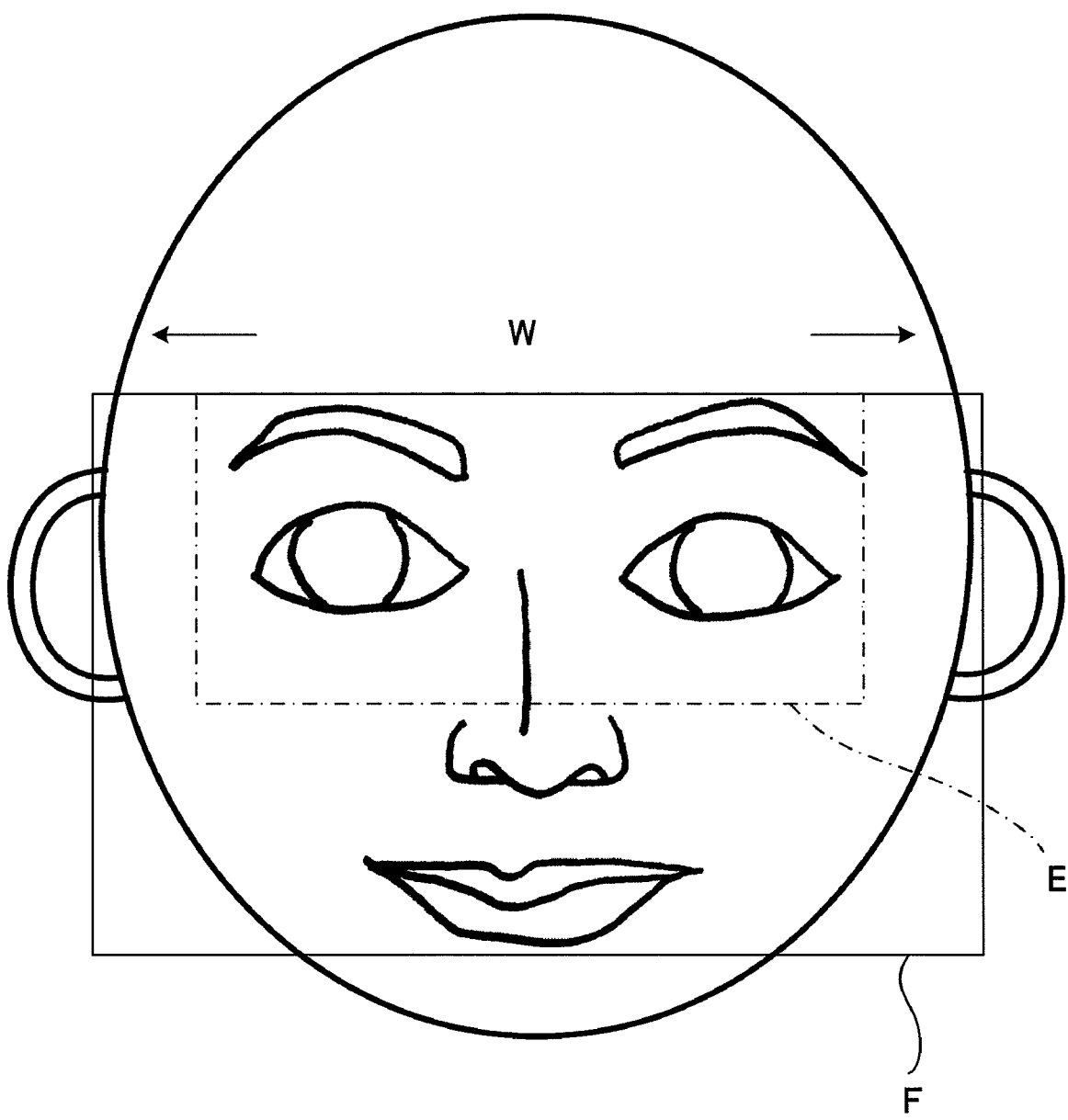
FIG. 4 is a diagram showing an example of data for determining a face region.

The eye search region setting unit 22 extracts the face region from the face image data 51 and sets the eye search region in the face region. In order to extract the face region, for example, edges of a face contour are detected in the face image. Alternatively, the face contour may be extracted by performing pattern matching. Eyebrow edges and mouth edges are respectively detected i upper and lower portions of a range defined by the face contour, thereby setting the face region. Then, the eye search region is set in the face region based on a ratio determined by a statistical data. FIG. 4 shows examples of a face region F and an eye search region E. The eye search region setting unit 22 stores the face region F and the eye search region E as a face region-eye search region data 52 in the data storing unit 5.

The eye search region E may be set based on an easy-to-detect portion that has a distinctive feature. For example, nostrils are detected and the eye search region E may be set based on the positions of the nostrils. Alternatively, he eye search region E is set by using a distance between the eyebrow and the nostril and width of the face contour. For example, length of the eye search region E is calculated by multiplying the distance between the eyebrow and the nostril by a predetermined ratio and width of the eye search region E is calculated by multiplying the width of the face contour by a predetermined ratio. Then, the calculated length is set as the length of the eye search region E and the upper side of the eye search region E is placed on the eyebrow. As for the width of the eye search region B, the calculated width is set as the width of the eye search region E and the eye search region E is placed along a horizontal centerline of the face contour. Setting the eye search region E improves the efficiency of the eye detection.

Figure 5:
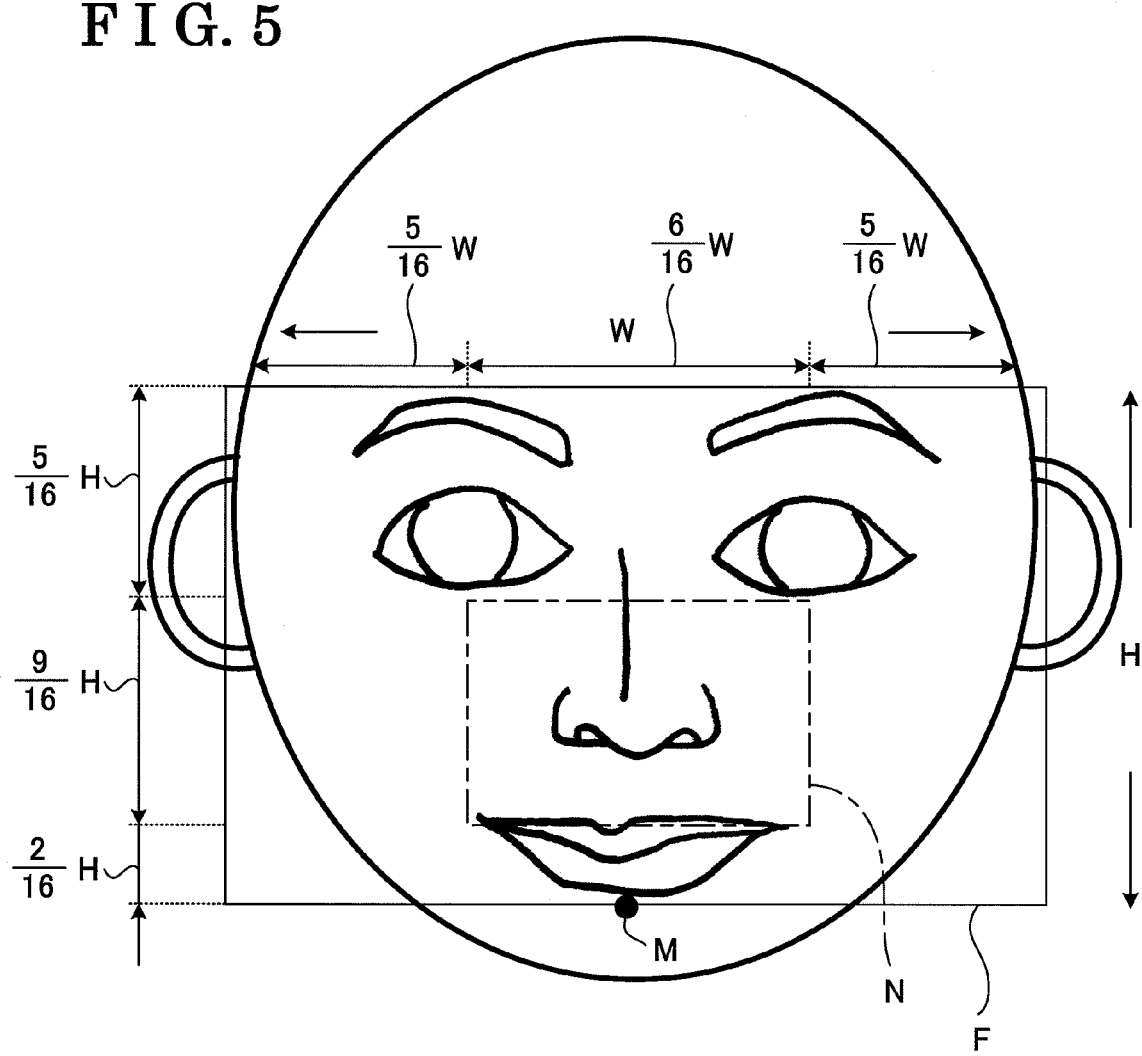
FIG. 5 is a diagram showing an example of a nostril search region.

FIG. 5 illustrates an example of a nostril search region N. A region surrounded with a chain line in FIG. 5 represents the nostril search region N. For example, in a case where height of the face region F is referred to as H and width of the face region F is referred to as W, a rectangular region which is 9/16 H long and 6/16 W wide is placed at a position which is 2/16 H higher than a lower lip point M and is placed on a center of the face region F in the horizontal direction to be set as the nostril search region N.

Figure 6:
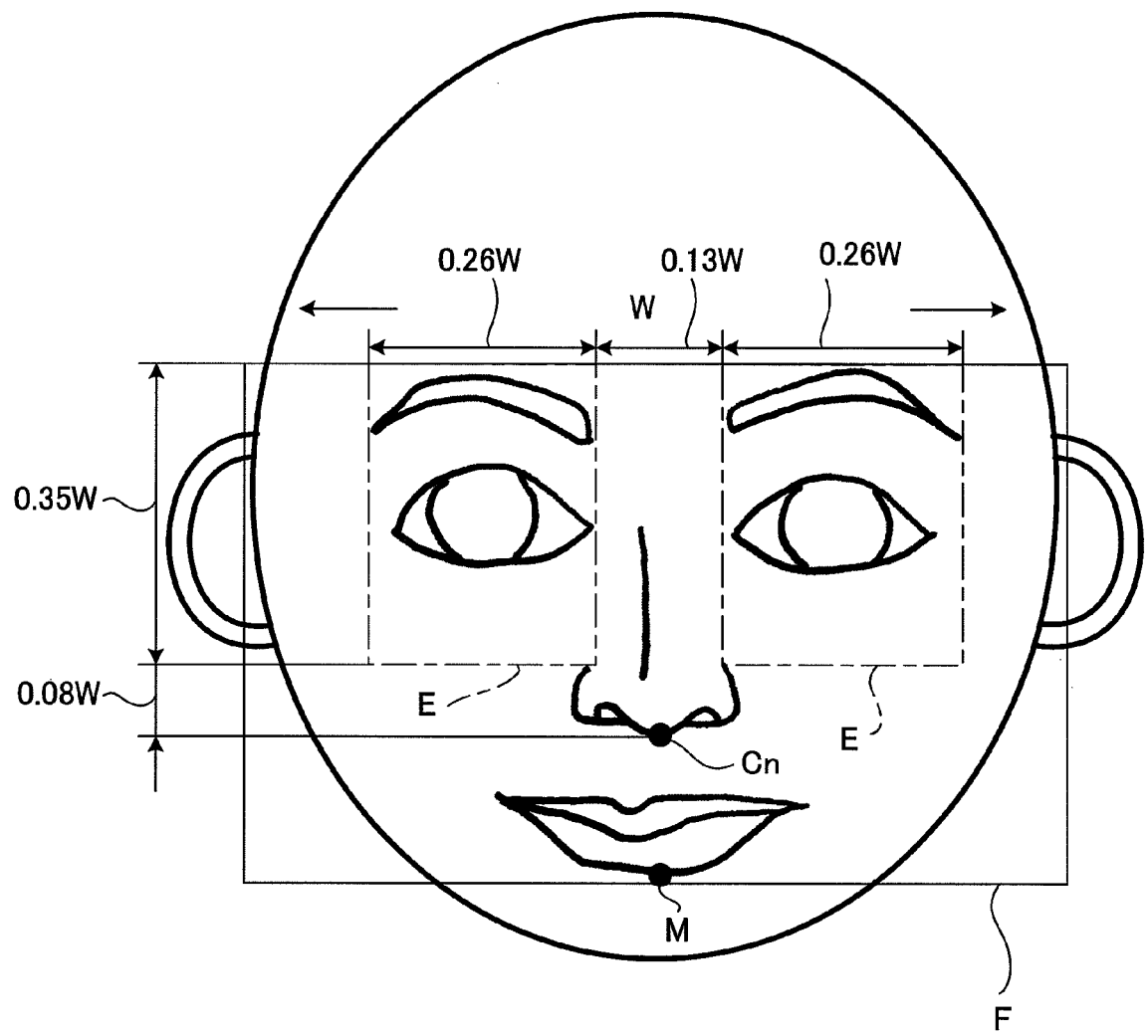
FIG. 6 is a diagram showing an example of an eye search region.

FIG. 6 is a diagram showing an example of the eye search region E. In FIG. 6, two rectangles surrounded by the chain line represent the eye search region E. For example, providing that the width of the face region F is referred to as W, each of the eye search region E is set to a rectangle which is 0.35 W long and 0.26 W wide. Each rectangle is placed at a position 0.08 W higher from a centroid of each nostril. Fodder, the two rectangles are spaced away from each other by 0.13 W. Then, the two rectangles are respectively set as the eye search regions E.

As shown in FIGS. 4 and 6, the external memory 13 stores data for determining the face region F, data for determining he eye search region E and image window data 55 from among the face images stored in the main memory 15. As described above, the eye search region E is a region where the eyes and the eyebrows are presumed to be present. The image window data 55 is for detecting the face feature point such as eyelids, by scanning the edge images.

Figures 7B, 7C:
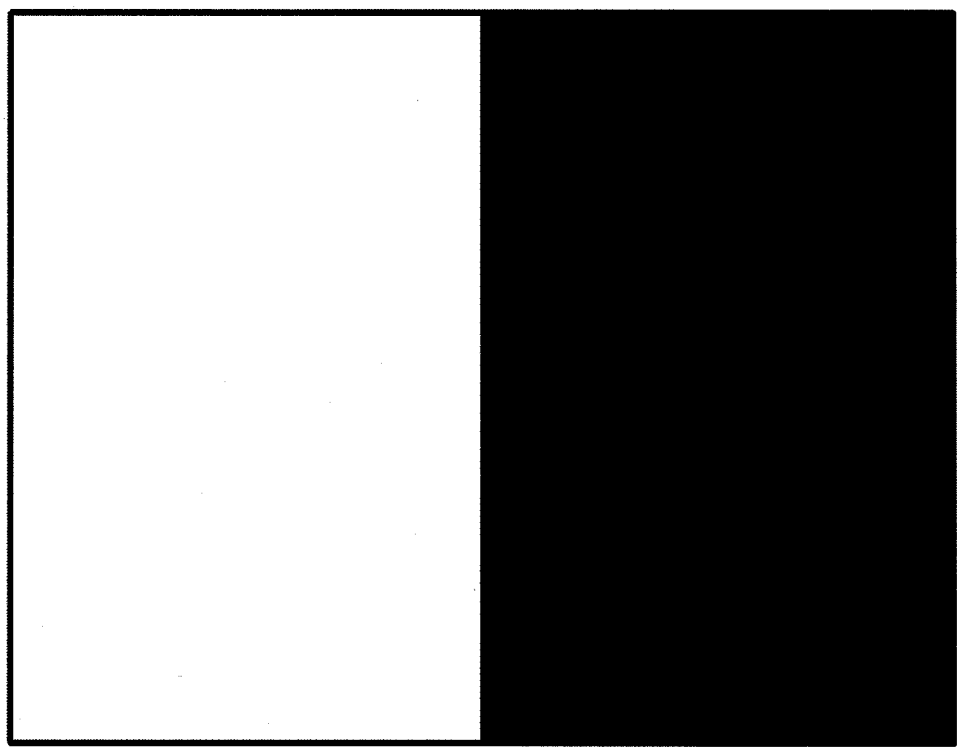
FIG. 7B is a diagram showing an example of an operator for lateral edge detection.
FIG. 7C is a diagram showing an example of gray level difference which is continuous in a vertical direction.

FIGS. 7A, 7B, 7C and 7D are diagrams for describing an example of fixed data that is used for edge detection. The external memory 13 stores operators of the sobel filter for horizontal edge detection and vertical edge detection as shown in FIGS. 7A and 7B. In this embodiment, a horizontal edge is defined as clustered dots whose luminance changes from bright to dark, or from dark to bright in the horizontal direction. The dots of the horizontal edges are usually clustered continuously in a longitudinal direction. Hence, the horizontal edge is also referred to as a longitudinal direction of the image. On the other hand, the vertical edge is defined as clustered dots whose luminance changes from bright to dark, or from dark to bright in the vertical direction. The dots of the vertical edges usually are clustered continuously in a lateral direction of the image. Hence, the vertically edge is also referred to as a lateral edge.

Figure 7D:
FIG. 7D is a diagram showing an example of gray level difference which is continuous in a horizontal direction.

The sobel filter for the horizontal edge detection (longitudinal edge) shown in FIG. 7A is an operator for extracting vertically continuous boundaries between dark color and bright color (edge) shown in FIG. 7C. The sobel filter for the vertical edge detection (lateral edge) shown in FIG. 7B is an operator for extracting laterally continuous boundaries between the dark color and the bright color (edge) as shown in FIG. 7D.

Each value of the sobel filter for horizontal edge detection is multiplied by a luminance value of the corresponding pixel. Then, the products of each sobel filter value and the luminance value are added and the sum of these products is defined as a horizontal edge value of the pixel located in a center of the filter. Similarly, each value of the sobel filter for vertical edge detection is multiplied by a luminance value of the corresponding pixel. Then, the products of each sobel filter value and the luminance value are added and the sum of these products is defined as a vertical edge value of the pixel located in the center of the filter.

An absolute value of the edge value becomes large in a region with strong luminance change observed in the direction. In a region with subtle luminance change, the absolute value is small. The edge value becomes 0 in a region where the luminance change is not observed. Namely, the edge value corresponds to a partial derivative of the luminance in a certain direction. The edge value may be set to a value determined by methods other than the sobel filter shown in FIGS. 7A and 7B as far as the value indicates the degree of the luminance change in a certain direction. The horizontal and vertical edge values may be calculated for each pixel of the image. The horizontal edge values of the pixels are arranged based on the pixel arrangement of the original image to create a horizontal edge image, and the vertical edge values of the pixels are arranged based on the pixel arrangement of the original image to create a vertical edge image.

The edge value may indicate a luminance change observed in any direction of the image. Namely, the edge value calculation is not limited to We horizontal or vertical direction of the image. For example, the luminance changing in an upper right direction at 45 degree angle, or the luminance change in a lower right direction at 45 degree angle may be indicated by the edge value. When the edge values are calculated with respect to two directions, the luminance change of the two directions, which are orthogonal to one another, should be used. Usually, the image is represented by arranging the pixels divided by horizontal and vertical grids. Thus, the edge value is often calculated in the horizontal and vertical directions.

When applying the sobel filter for horizontal edge detection shown in FIG. 7A, each of the horizontal edge values of the clustered pixels, changing its luminance from bright to dark in a left to right direction of the image, takes a positive value, and each of the horizontal edge values of the clustered pixels, changing its luminance from dark to bright, takes a negative value. When the clustered pixels change its luminance from bright to dark in the left to right direction and each of the horizontal edge values of the pixels is higher than a predetermined value, the clustered pixels are considered as a longitudinal plus edge. Further, when the clustered pixels changes its luminance from dark to bright in the left to right direction and each absolute value of the horizontal edge values of the clustered pixels is higher than the predetermined value, the clustered pixels are considered as a longitudinal minus edge.

When applying the sobel filter for vertical edge detection shown in FIG. 7B, each of the vertical edge values of the clustered pixels, changing its luminance from bright to dark in a downward direction of the image, takes a positive value, and each of the horizontal edge value of the clustered pixels, changing its luminance from dark to bright, takes a negative value. When the clustered pixels change its luminance from bright to dark in the downward direction and each of the vertical edge values of the clustered pixels is higher than a predetermined value, the clustered pixels are considered as a lateral plus edge. Further, when the clustered pixels changes its luminance from dark to bright in the downward direction and each absolute value of the vertical edge values of the clustered pixels is higher than a predetermined value, the clustered pixels are considered as a lateral minus edge.

Figure 8:
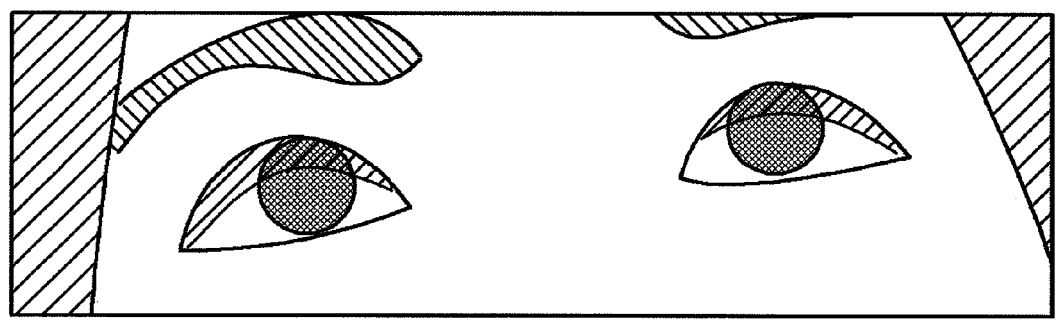
FIG. 8 is a schematic view showing an example of an original image of an eye search region.
Figure 9A:
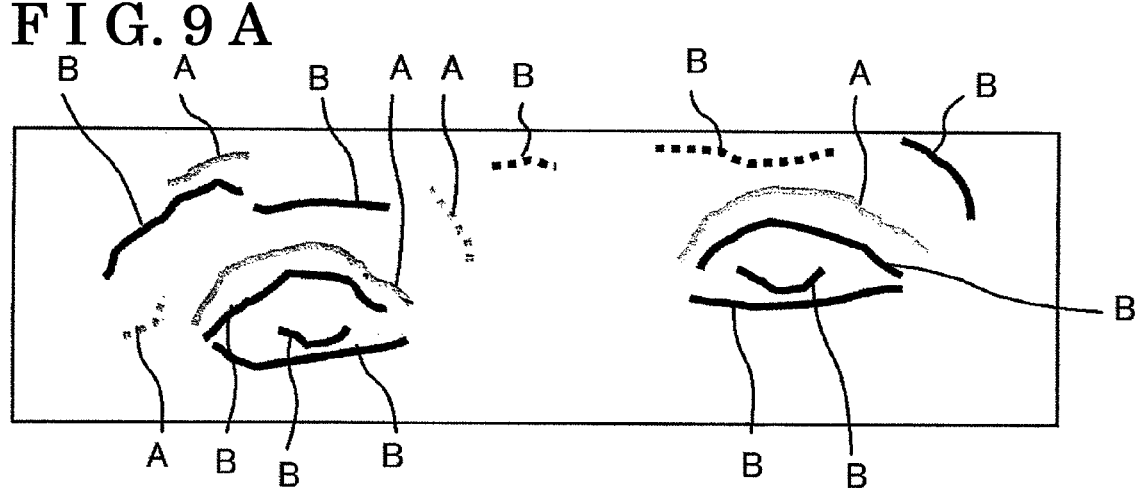
FIG. 9A is a diagram showing an example of vertical edge detection in the eye search region.
Figure 9B:
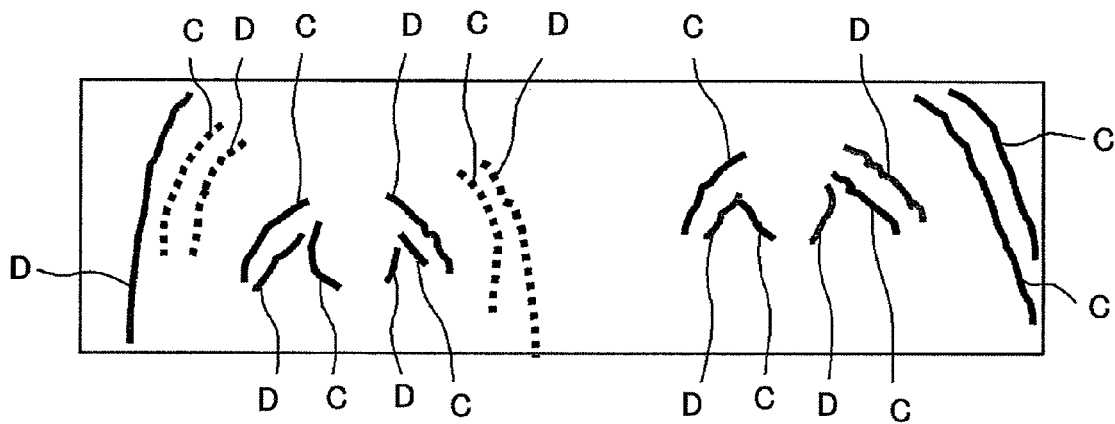
FIG. 9B is a diagram showing an example of horizontal edge detection in the eye search region.
Figure 9C:
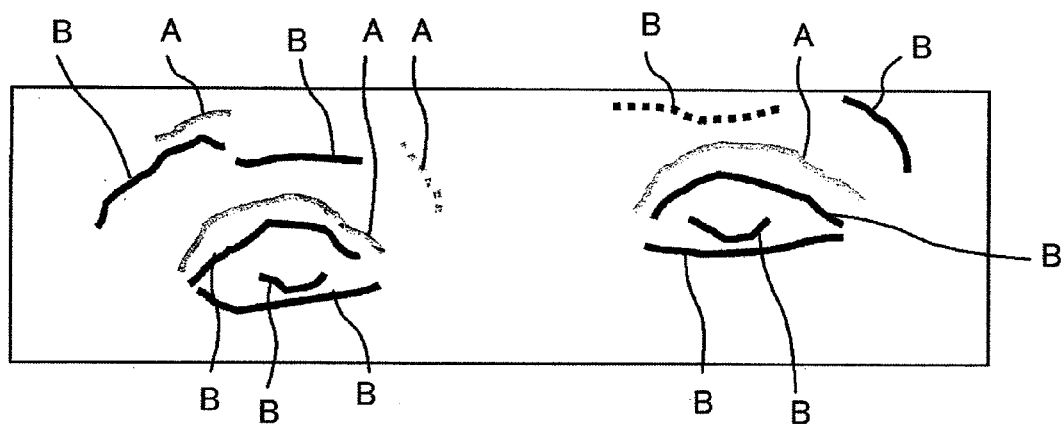
FIG. 9C is a diagram showing a resulting image after removing edges with subtle gray level difference from the vertical edges shown in FIG. 9A.
Figure 9D:
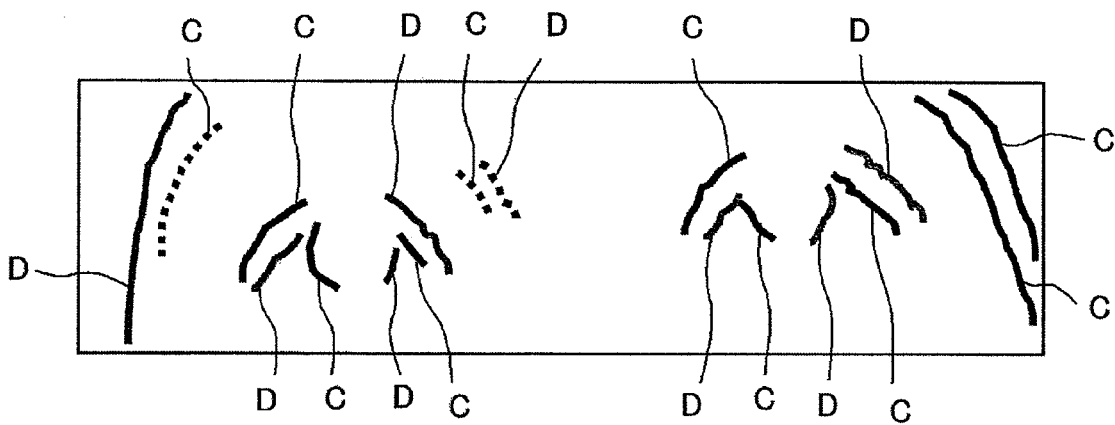
FIG. 9D is a diagram showing a resulting image after removing edges with subtle gray level difference from the horizontal edges shown in FIG. 9B.

The edge calculating unit 23 creates the horizontal edge image and the vertical edge image by applying the filters such as the filters shown in FIGS. 7A and 7B. FIG. 8 schematically shows an example of an original image of the eye search region E. In FIG. 8, a dark region of the image is hatched. In FIG. 8, a case where upper eyelid shadows appear is shown as an example. FIG. 9A shows an example of the, vertical edges detected from the original image of the eye search region E. FIG. 9B shows an example of horizontal edges detected from the original image of the eye search region E.

In FIG. 9A, a cluster of dots changing its luminance from bright to dark in the downward direction is referred to as a lateral plus edge A, and a cluster of dots changing its finance from dark to bright in the downward direction is referred to as a lateral minus edge B. Prominent edges, out of the lateral plus edges A, are considered as upper eyelid candidates. Further, prominent edges, out of the lateral minus edges B, are considered as lower eyelid candidates. Other than the above-described candidates, upper and lower edges of the eyebrows, lower edges of upper eyelid shadows (or eye shadow), lower edges of irises are detected as the vertical edges.

In FIG. 9B, a cluster of dots changing its luminance from bright to dark in a left to right direction is considered as a longitudinal plus edge C, and a cluster of dots changing from dark to bright in the left to right direction is considered as a longitudinal minus edge D. The longitudinal edge (horizontal edge) appears at both ends of each upper eyelid. Thus, each upper eyelid is basically comprised of the longitudinal plus edge C, the lateral plus edge A, and the longitudinal minus edge D and these edges are arranged from the left to the right of the eyelid in an above-described order. In the lower eyelid, the lateral minus edge B (vertical edge) appears, however, the longitudinal edge (horizontal edge) rarely appears. In FIG. 9B, the eye search region E is formed so as to be long in a horizontal direction, and thus, the face contour appears as the longitudinal edges. Further, shadows of eye pits, the shadows of the upper eyelids (or the eye shadow), left and right edges of the irises are detected as the horizontal edges.

The edge calculating unit 23 removes an edge from the detected edges when gray level difference in the edge is less tan a predetermined value. In other words, an edge is removed from the detected edges when the difference of the luminance values between the pixels in the horizontal edge or the difference of the luminance values between the pixels in the vertical edge is less than the predetermined value. Corresponding to FIGS. 9A and FIG. 9B, FIGS. 9C and 9D are diagrams in which the edges with small gray level difference are removed.

The edge calculating unit 23 stores the detected horizontal and vertical edges as he horizontal-vertical edge data 53 in the data storing unit 5.

The edge labeling unit 24 removes an edge from the horizontal-vertical edge data 53 when the number of he continuously clustered pixels, each having an edge value whose absolute value is higher than or equal to a predetermined value, does not reach a predetermined number (continuous score). Here, an edge is removed by setting 0, indicating no luminance change, to the edge values of the pixels of the edge.

Figure 9E:
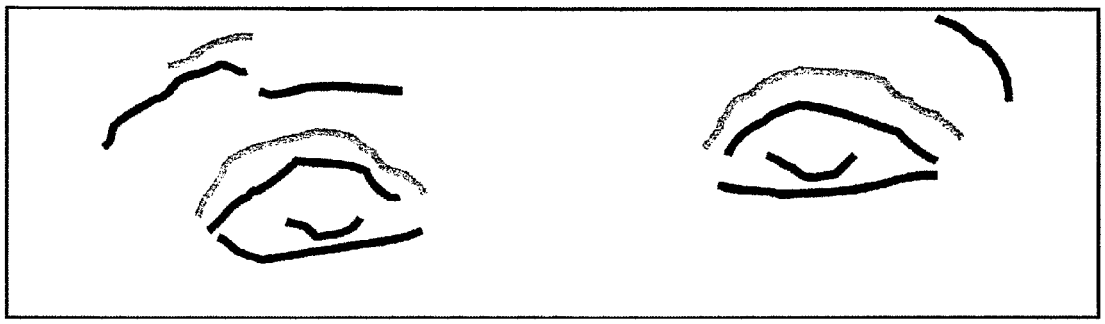
FIG. 9E is a diagram showing a resulting image after removing short edges from the vertical edges shown in FIG. 9C.
Figure 9F:
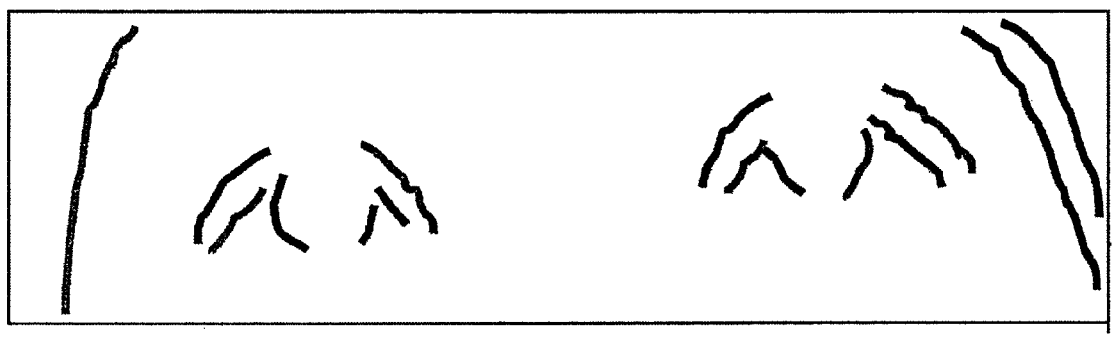
FIG. 9F is a diagram showing a resulting image after removing short edges from the horizontal edges shown in FIG. 9C.

Further, continuously clustered dots, having a length which is longer than or equal to the predetermined length, are grouped as an edge. FIG. 9E shows the resulting image of the eyelid edge labeling performed on the vertical edges shown in FIG. 9C. FIG. 9F shows the resulting image of the eye edge labeling performed on the horizontal edges shown in FIG. 9D. Removing the short edge points, considered as noise, from the edge image allows the eyelid detection apparatus 1 to perform the scanning with the image window and determine a largest weighted sum with greater accuracy. Details of the processing will be described below.

The edge labeling unit 24 stores the horizontal-vertical edge image data, in which the noise is removed, as the candidate edge data 54 in the data storing unit 5. In FIGS. 9E and 9F, the short edges have been removed. In the candidate edge data 54, the continuously clustered dots are labeled as an edge.

Figure 10:
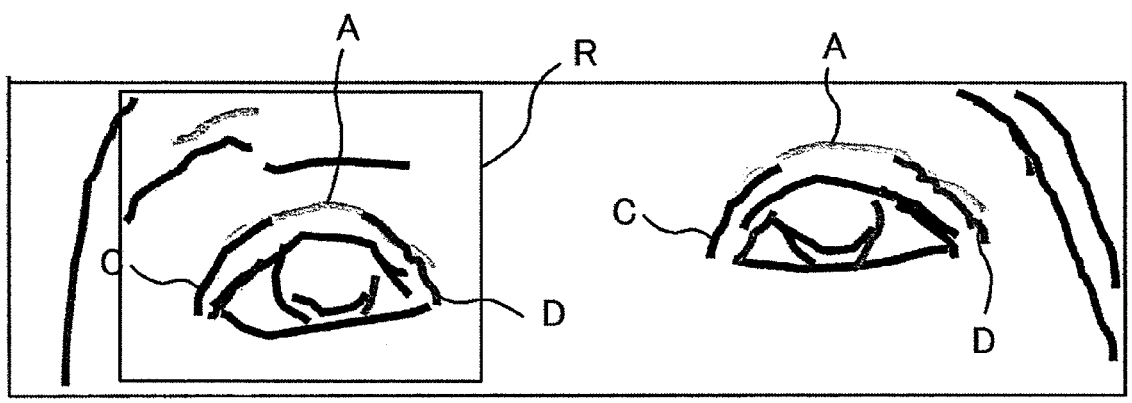
FIG. 10 is a diagram shown the vertical edges superposing on the horizontal edges.

In FIG. 10, the vertical and horizontal edges, which remain after the eyelid edge labeling, are superposed. The lateral plus edge A, appearing with the longitudinal plus edge C and the longitudinal minus edge D respectively appeared at one side and the other side of the lateral plus edge A, is considered as the most likely upper eyelid candidate.

The image window scanning unit 25 scans the candidate edge data 54, (or the horizontal-vertical edge data 53) with an image window which is an aggregation of selected pixels formed in a predetermined shape. The edge value corresponding to each pixel in the image window is multiplied by a predefined value determined on a per-pixel basis. Then, all products of each edge value and the predetermined value are added up to calculate a weighted sum. The image window is shifted by one pixel, and the weighted sum of the pixels included in the image window is calculated each shifting.

A weighting factor, which is the predetermined value to be multiplied to each edge value, is set based on properties of the face feature point to be detected. The weighting factor may be set to a constant value, for example 1 or −1, throughout the image window. Alternatively, the weighting factor may be set on the per-pixel basis. Namely, different values are set as the weighting factor in the single image window. When the weighting factor is uniformly set to 1 throughout the image window, the weighted sum equals the sum of the edge values of the pixels included in the image window. When the weighting factor is uniformly set to −1 throughout the image window, the weighting sum equals the sum of the edge values, each having an inverted sign, of the pixels included in the image window.

The image window may be comprised of a horizontal edge window used for scanning the horizontal edge image and a vertical edge window used for scanning the vertical edge image. When the scanning is performed, a constant positional relationship is maintained between the horizontal edge window and the vertical edge window. In that case, the image window scanning unit 25 multiplies the horizontal edge value corresponding to each pixel in the horizontal edge window by a predetermined value determined on the per-pixel basis and adds up all products of each horizontal edge value and the predetermined value to calculate the weighed sum. The image window scanning unit 25 similarly calculates the weighted sum of the pixels in the vertical edges by multiplying the vertical edge value corresponding to each pixel in the vertical edge window by a predetermined value determined on the per-pixel basis and adding up all products of each vertical edge value and the predetermined value. Then, the image window scanning unit 25 calculates a total weighted sum (grand total) by adding the weighted sum of the horizontal edge values to the weighted sum of the vertical edge values.

The image window scanning unit 25 stores each weighted sum and total weighted sum (grand total) calculated as described above as scanning score data 56 in the data storing unit 5.

The feature position determining unit 26 determines a position of the image window having the largest weighted sum or the largest total weighted sum in the weighted sums calculated by the image window scanning unit 25 to be a position where the feature point to be detected are present (detection position).

Figure 11:
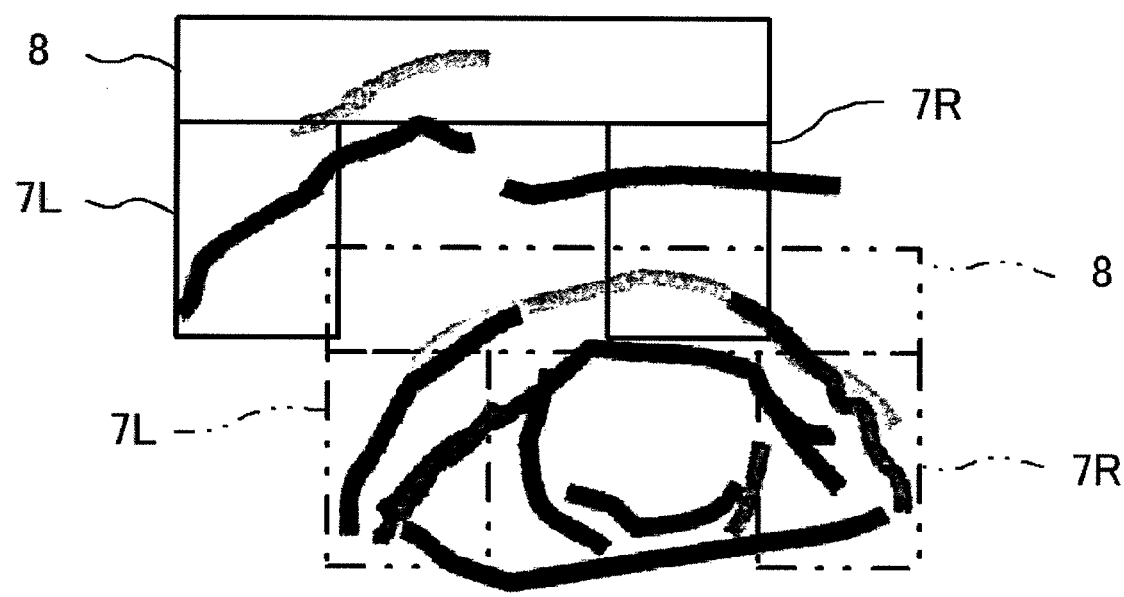
FIG. 11 is a diagram describing image window scanning and feature point detection.
Figure 12:
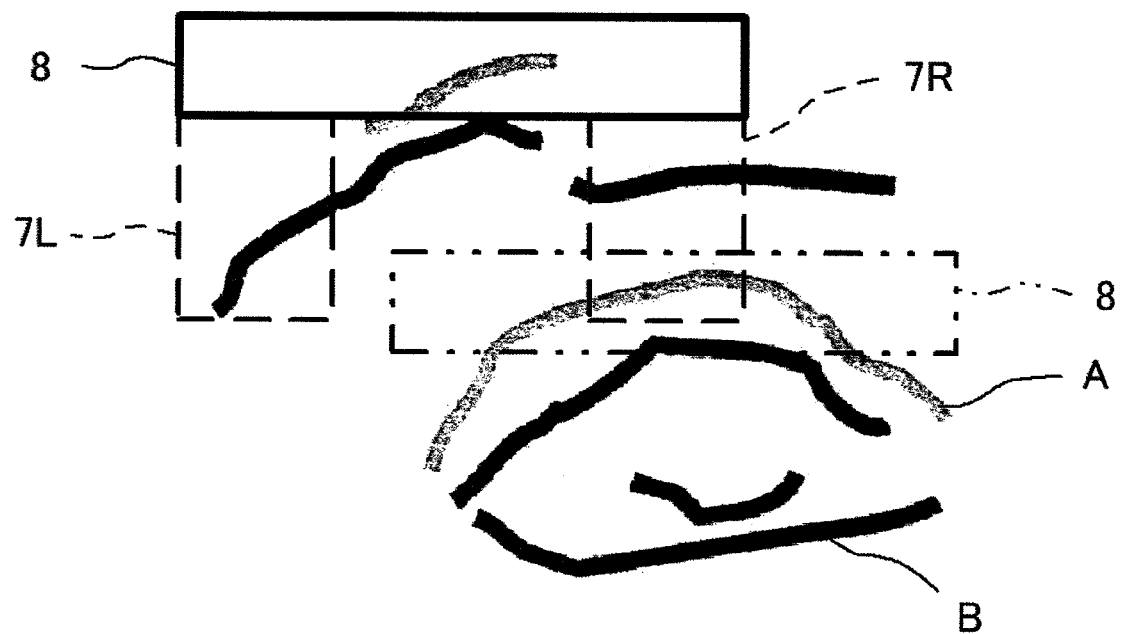
FIG. 12 is a diagram showing scanning performed by a vertical edge window detached from the image window.
Figure 13:
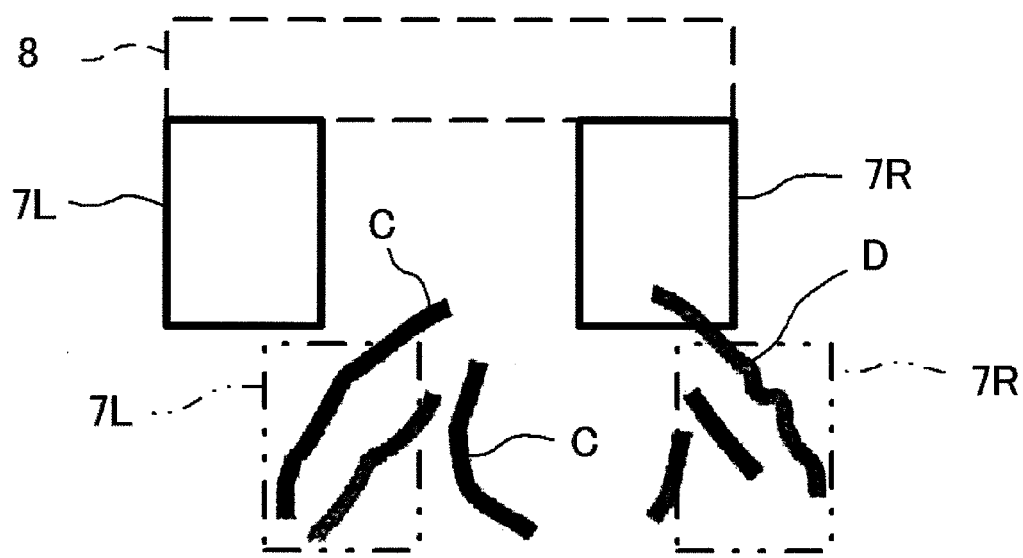
FIG. 13 is a diagram showing scanning performed by a horizontal edge window detached from the image window.

FIGS. 11 to 13 are diagrams for describing the image window scanning and the feature point detection. In FIGS. 11 to 13, a region sounded by a rectangle R of FIG. 10 is enlarged. The image window is composed of horizontal edge windows 7L and 7R and a vertical edge window 8. A constant positional relationship is maintained between the horizontal edge windows 7L and 7R and the vertical edge window 8, while the scanning is being performed on the horizontal and vertical edge images by the image window scanning unit 25. In FIG. 11, the position of the image window having the largest total weighted sum is shown in the chain double dashed line.

FIG. 12 shows the scanning performed with the vertical edge window detached from he image window. The vertical edge image is scanned with the vertical edge window 8 alone, however, the horizontal edge windows 7L and 7R are shown in a dashed line to show that the constant positional relationship is maintained between the vertical edge window 8 and the horizontal edge windows 7L and 7R. In FIG. 12, the position of the vertical edge window 8 having the largest weighted sum is indicated by the chain double dashed line.

The weighting factor is uniformly set to a constant value, i.e. 1, throughout the vertical edge window 8 for detecting the lateral plus edge of the upper eyelid. Namely, he edge value of the lateral minus edge is negative and therefore the weighted sum calculated by scanning the vertical edge window 8 is unlikely to be the largest value. Hence, the horizontal minus edge B of FIG. 12 is not detected when setting the weighting factor to 1. When performing the scanning with the vertical edge window 8 alone, the vertical edge window having the largest weighted sum might be positioned at a lower level shown by the chain double dashed line of FIG. 12. The horizontal position of the lateral plus edge may not be determined by the vertical edge window 8 alone.

FIG. 13 shows the scanning performed by the horizontal edge window detached from the image window. The horizontal edge image is scanned by the horizontal edge windows 7L and 7R alone, however, the vertical edge window 8 is show in the dashed line to show that the constant positional relationship is maintained between the vertical edge window 8 and the horizontal edge windows 7L and 7R. In FIG. 13, the positions of the horizontal edge windows 7L and 7R having the largest total weighted sum are indicated by the chain double dashed line.

The weighting factor is uniformly set to a constant value, i.e. 1, throughout the horizontal edge window 7L to detect the longitudinal plus edges C of the upper eyelid. The weighting factor is uniformly set to a constant value, i.e. −1, throughout the horizontal edge window 7L to detect the longitudinal minus edges D of the upper eyelid. Thus, as indicated by the chain double dashed line in FIG. 13, the total weighted sum of the horizontal edge windows 7L and 7R becomes the largest at a position where the horizontal edge window 7L is on the longitudinal plus edge C and the horizontal edge window 7R is on the longitudinal minus edge D. When the scanning is performed with the horizontal edge windows 7L and 7R alone, the largest total weighted sum may be positioned slightly upper than a position indicated by the chain double dashed line in FIG. 13. Basically, the positional relationship between the horizontal edge windows 7L and 7R and the vertical edge window 8 should be considered for determining the position of The image window having the largest total weighted sum.

FIG. 11 is a diagram in which the vertical edge image of FIG. 12 and the horizontal edge image of FIG. 13 are superposed. As described above, the constant positional relationship is maintained between the vertical edge window 8 and the horizontal edge windows 7L and 7R while scanning the horizontal and vertical edge image respectively. As a result, the position of the image window having the largest total weighted sum is determined to be the detection position. For example, the position of the image window indicated by the chain double dashed line in FIG. 11 is determined to be the position of the upper eyelid.

Figure 14:
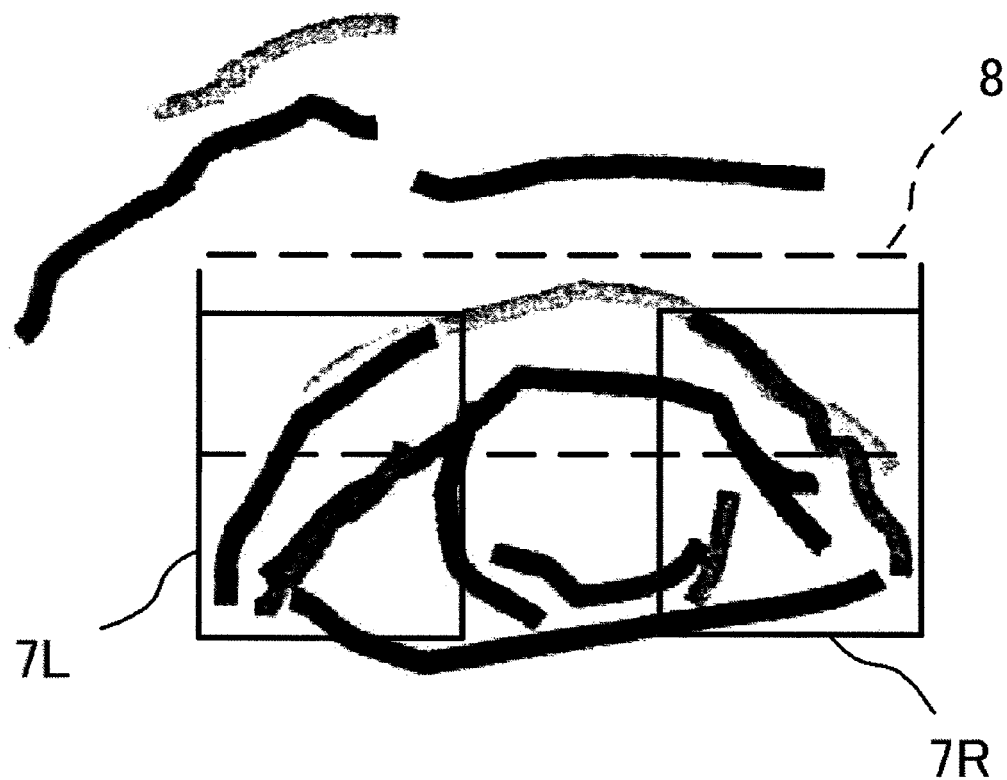
FIG. 14 is a diagram showing an another example of the image window.

FIG. 14 shows another example of the image window. It is not necessary that the horizontal edge windows 7L and 7R are in contact with the vertical edge 8 within the image window. As far as the constant positional relationship is maintained therebetween, the pixels of the horizontal and vertical image widows may be overlapped or spaced away. In FIG. 14, the pixels of the horizontal edge windows 7L and 7R and the vertical edge 8 are overlapped.

The image window need not be composed of sub-windows, which are the aggregations of the selected pixels formed in the rectangular shape. The shape of the image window may be determined depending on the feature point to be detected. For example, the shape of the image window may be a part of an arc, an aggregation of the arcs, or a pixel pattern determined based on statistical data. Further, the weighting factor may be set based on the properties of the feature point of the face to be detected.

Figure 15:
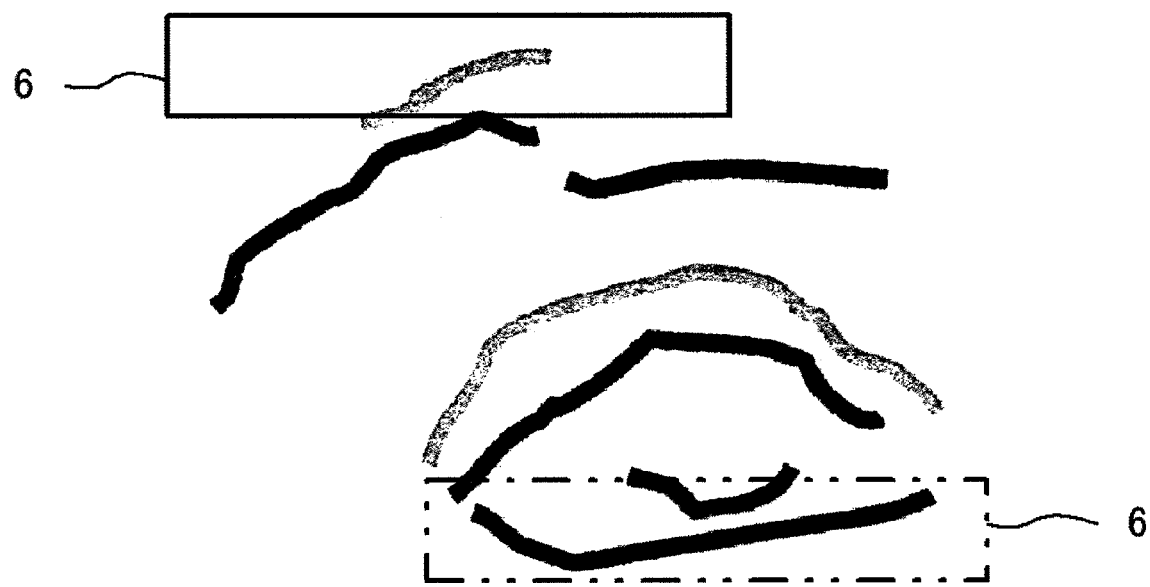
FIG. 15 is a diagram showing an example of an image window for detecting the lower eyelid.

FIG. 15 shows an example of an image window for detecting the lower eyelid. Since the horizontal edge rarely appears in the lower eyelid, the scanning on the vertical edge image will do. For example, the vertical edge image is scanned with the image window 6 shown in FIG. 15, and the position of the image window 6 having the largest weighted sum is detected as indicated by the chain double dashed line in FIG. 15. When the position of the upper eyelid has been detected, the scanning range of the image window 6 for detecting the lower eyelid may be further limited.

Figure 16:
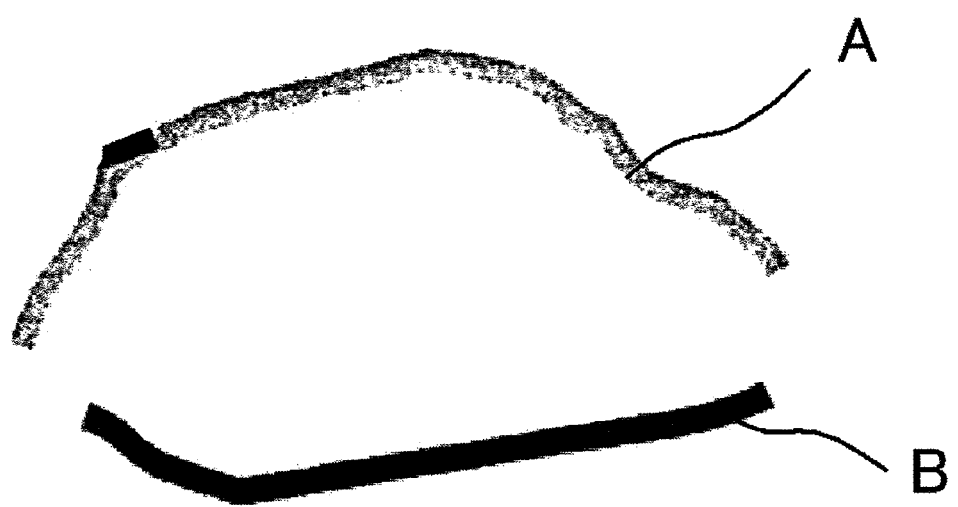
FIG. 16 is a diagram showing detected vertical edges of upper and lower eyelids.

The positions of the upper and lower eyelids are determined as described above. In FIG. 16, a vertical edge A detected as an upper eyelid and a vertical edge B detected as a lower eyelid are shown. The eyelid determining unit 27 determines the opening and closing degree of the eyes based on edge data. The edge data is created based on the edges which are on the positions of the upper and lower eyelids.

The display processing unit 28 displays the detection result i.e. the upper and lower eyelids, as well as the face contour and the like on the display device 4. The arousal level of the driver is presumed from the opening and closing degree of the upper and lower eyelids, and the eye detection apparatus 1 displays warning messages, which may include audible warnings, on the display device 4 when detecting that he driver falls asleep. Further, the data of the upper and lower eyelids may be utilized for presuming the direction of the gaze.

The operation of the eye detection apparatus 1 will be described. The control unit 14 conducts the operation of the eye detection apparatus 1 by co-operating with the camera 2, the transmitting and receiving unit 16, the image memory 12, the external memory 13, and the main memory 15.

FIG. 17 is a flowchart showing an example of the operation in the face feature point detection processing. The control unit 14 inputs the face images from the camera 2 through the transmitting and receiving unit 16 in Step S1. Then, as described above, the face region is set and the eye search region is set within the face region in Step S2.

The control unit 14 detects the horizontal edges and the vertical edges in the eye search region set as described above in Step S3 (edge calculating step). The control unit 14 groups the detected horizontal and vertical edges to perform the eyelid edge labeling such as removing the edge when the length of the edge is shorter than the predetermined length, i.e. continuous score, in Step S4. Further, the position of the image window is initialized in the edge image.

Next, the control unit 14 multiplies the horizontal edge value, corresponding to each pixel in the horizontal edge window, by the predetermined value determined in the per-pixel basis and adds up all products of each horizontal edge value and the predetermined value to calculate the weighted sum. The control unit 14 also multiplies the vertical edge value, corresponding to each pixel in the vertical edge window, by the predetermined value determined in the per-pixel basis and adds up all products of each vertical edge value and the predetermined value to calculate the weighted sum. Then, the control unit 14 adds the weighted sum of the horizontal edge value to the weighted sum of the vertical edge value to calculate the total weighed sum in Step S5 (detection target determining step). The total weighted sum calculated as above is stored as a value obtained at the position of the image window.

The control unit 14 shifts the image window by one pixel in Step S6. Then, the 10 control unit 14 determines if the image window is in the search region in Step S7. If the image window is in the search region (Step S7; Yes), the process is returned to Step S5 to calculate the total weighted sum of the image window.

If the image window is not in the search region (Step S7; No), the image window is moved to a next scanning line in Step S8. Then, the operation is resumed from Step S5. The calculation of the total weighted sum of the image window and the window shift are iteratively looped back while the image window is in the search region (Step S9; Yes).

Only if the image window is not in the search region (Step S9; No), after the image window is moved to the next scanning line in Step S8, the position of the feature point is detected in Step S10 (detection target determining step). Namely, the position of the image window having the largest total weighted sum in the total weighted sums calculated in Step S5 is determined to be the detection position of the feature point. The horizontal and/or vertical edges on the position of the image window are extracted as the edges composing the feature point.

According to the embodiment, we eye detection apparatus 1 accurately detects the eyes in the face image data without being subject to influence of ambient light or individual differences in facial structure.

According to the embodiment, tie eyelid detection is described as an example. However, the technique of the embodiment is applicable to the detection of feature points other than the eyelid by setting the image window and the weighting factor in accordance with the detection target. Even if the face image from which the feature point is searched contains he noise, the noise is removed to some extend by removing the edge lines whose lengths are shorter than the predetermined length as noise contents. Hence, the position of the feature point is determined with greater accuracy. In the embodiment, the position of the image window having the largest total weighted sum is determined to be the detection position where the detection target is present. However, the detection method is not limited to the above-described method, the detection position may be determined by other methods. For example, a threshold value is set in the image window and the number of the edge values which are greater than the threshold value is counted. Then, the position of the image window, containing the largest number of the edge values which are greater than the threshold value, is determined to be the detection position.

The above-mentioned hardware configuration and the processing illustrated in the flowchart describe only al example of the configuration and the operation of the eye detection apparatus 1, and any desired changes and modifications may be made.

The main portion of the eye detection apparatus 1, conducting the operation, includes the control unit 14, the transmitting and receiving unit 16, the image memory 12, the external memory 13, the main memory 15 and the like. The main portion may be configured by a computer system for general use, not a dedicated system. For example, a computing program for executing the above-mentioned operation is stored in a readable storage media such as a flexible disc, the CD-ROM, DVD-ROM and the like for distribution, and the eye detection apparatus 1 may be configured so that the above-described operation is conducted by installing the program on the computer. Alternatively, the program is stored in a storage media included in a server on the communication network such as internet and the like, and the eye detection apparatus 1 may be configured so that the above-described operation is conducted by downloading the program onto the computer system.

Further, when the functions of the eye detection apparatus 1 are accomplished by assigning the tasks to the operation system (OS) and the application programs or co-operating the operation system and the application programs, only the application programs may be stored in the storage media or the memory device.

Additionally, the computing system may be distributed through the communication network by superimposing the computing program on a carrier wave. For example, the computing program may be distributed through the network by uploading the program to a bulletin board system (BBS) on the communication network. The eye detection apparatus 1 may be configured so that the above-described processes are executed by activating the computer program and running the application program under the control of the operation system in a similar manner to other applications.

The image window is the aggregation of the selected pixels formed in the predetermined shape and is comprised of the plural sub-windows which maintain the constant positional relationship during scanning the edge image. The position of the image window having the largest total weighted sum is to be the detection position that the detection target is present. As described above, the largest total weighted sum is calculated by adding the weighted sums of the edge values, corresponding to the pixels in each sub-window on a one-to-one basis.

The horizontal edge image is created by arranging the horizontal edge value indicating the luminance change in the horizontal direction based on the pixel arrangement in the face image, and the vertical edge image is created by arranging the vertical edge value indicating the luminance change in the vertical direction based on the pixel arrangement in the face image. The image window includes the horizontal edge windows 7L and 7R and the vertical edge window 8, which are composed of the aggregation of the selected pixels. The pixels of the horizontal and vertical edge windows 7L, 7R and 8 are selected to be formed in the shape of the section to be scanned, and the constant positional relationship is maintained between he horizontal edge windows 7L and 7R and the vertical edge window 8 during the scanning. The position of the image window having the largest total weighted sum of the horizontal edge value and the vertical edge value is determined to be the detection position that the detection target is present. The total weighted sum is calculated by adding the weighted sum of the horizontal edge values to the weighted sum of the vertical edge value, the horizontal edge values corresponds to the pixels in each horizontal edge window 7L, 7R on a one-to-one basis, and the vertical edge values correspond to the pixels in the vertical edge window 8 on a one-to-one basis.

Further, the eye detection apparatus 1 includes the edge labeling unit 24 removing an edge containing continuously clustered pixels whose number is less than the predetermined value, providing that each pixel has the edge value whose absolute value is higher than or equal to the predetermined threshold value.

In particular, the eye is the detection target. The vertical edge window 8 corresponds to the vertical edge of the eyelid, and the horizontal edge windows 7L and 7R corresponds to the horizontal edge of an inner corner or a outer corner of the eye.

The two horizontal edge windows 7L and 7R, corresponding to the inner and outer corners of the eye, are located at the both sides of the vertical edge window 8 at he level lower than the vertical edge window 8.

The face feature detection method includes a step for calculating the edge values, each indicating the luminance change in a certain direction, and a step for scanning the edge image, which is created by arranging the edge values based on the pixel arrangement of the face image, with the image window which is the aggregation of the selected pixels formed in the predetermined shape. The face feature detection method further includes a step for determining the position of the image window having the largest total weighted sum to be the detection position that the detection target is present. The total weighted sum is calculated by multiplying the edge value which corresponds to each pixel in the image window by the predetermined value defined on the per-pixel basis and the adding products of the edge value and the predetermined value.

The computer 10 runs the programs and executes the following steps based on the commands from the program. The computer 10 calculates the edge values, each indicating the luminance change in a certain direction, and to perform the scanning on the edge image, which is created by arranging the edge values calculated based on the pixel arrangement of the face image, with the image window which is the aggregation of the selected pixels formed in the predetermined shape. Further, the computer 10 determines the position of the image window having the largest total weighted sum to be the detection position that the detection target is present. The total weighted su is calculated by multiplying the edge value which corresponds to each pixel in the image window by the predetermined value defined on the per-pixel basis and adding the products of the edge value and the predetermined value.

According to the embodiment of the invention, the face feature point detection apparatus 1 detects the feature point in the face image with great accuracy, irrespective of ambient light individual differences in the facial structure.

The principles, of the preferred embodiments and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A face feature point detection apparatus, comprising:
an image capturing means capturing a face image;
an edge calculating means creating a horizontal edge image by arranging horizontal edge values based on a pixel arrangement in the face image, each horizontal edge value indicating a luminance change in a horizontal direction, and creating a vertical edge image by arranging vertical edge values based on a pixel arrangement in the face image, each vertical edge value indicating a luminance change in a vertical direction, in the face image; and
a detection target determining means scanning the horizontal edge image and the vertical edge image, which are created by the edge calculating means with an image window, the image window including a horizontal edge window for scanning the horizontal edge image, the horizontal edge window being an aggregation of selected pixels formed in a predetermined shape corresponding to a horizontal edge of an inner corner of the eye or a horizontal edge of an outer corner of the eye, and including the vertical edge window for scanning the vertical edge image, the vertical edge window being an aggregation of selected pixels formed in a predetermined shape corresponding to a vertical edge of an eyelid, the horizontal edge windows corresponding to the inner and outer corners of the eye, being located at both sides of the vertical edge window at a level lower than the vertical edge window, the image window, configured by plural sub-windows, a constant positional relationship of which is maintained while scanning the edge image, the detection target determining means determining a position of the image window having a largest total weighted sum of total weighted sums to be a detection position where an eye, serving as a detection target, is present, providing that the total weighted sum is a total of each weighted sum in each sub-window, each weighed sum being calculated by multiplying the horizontal edge value which corresponds to each pixel in the horizontal edge window by a predetermined value defined on a per-pixel basis in the horizontal edge window and adding up all products of the horizontal edge value and the predetermined value and by multiplying the vertical edge value which corresponds to each pixel in the vertical edge window by a predetermined value defined on a per-pixel basis in the vertical edge window and adding up all products of the vertical edge value and the predetermined value.

2. A face feature point detection apparatus according to claim 1, the predetermined value, which is defined on a per-pixel basis in the horizontal edge window and by which the horizontal edge value corresponding to each pixel in the horizontal edge window is multiplied, and the predetermined value, which is defined on a per-pixel basis in the vertical edge window and by which the vertical edge value corresponding to each pixel in the vertical edge window is multiplied, are set to be a constant value in each of the sub windows for configuring the image window.

3. A face feature point detection apparatus according to claim 2, wherein the horizontal edge image is created by arranging the horizontal edge values based on a pixel arrangement in the face image, the horizontal edge values are defined so that pixels, changing luminance thereof from bright to dark in a left to right direction of the image, are set to be a positive value, pixels, changing luminance thereof from dark to bright in the left to right direction of the image, are set to be a negative value, and the other pixels are set to be zero, and wherein
the vertical edge image is created by arranging the vertical edge values based on a pixel arrangement in the face image, the vertical edge values are defined so that pixels, changing luminance thereof from bright to dark in an upper to lower direction of the image, are set to be a positive value, pixels, changing luminance thereof from dark to bright in the upper to lower direction of the image, are set to be a negative value, and the other pixels are set to be zero.

4. A face feature point detection apparatus according to claim 3, wherein a length of the vertical edge window in the horizontal direction is set to be longer than a length thereof in the vertical direction.

5. A face feature point detection apparatus according to claim 4, wherein the vertical edge window is formed into a rectangular shape.

6. A face feature point detection apparatus according to claim 4, further comprising:
a noise removing means removing an edge containing continuously clustered pixels whose number is less than a predetermined value, providing that each pixel has the edge value whose absolute value is larger than or equal to a predetermined threshold value.

7. A face feature point detection apparatus according to claim 5, further comprising:
a noise removing means removing an edge containing continuously clustered pixels whose number is less than a predetermined value, providing that each pixel has the edge value whose absolute value is larger than or equal to a predetermined threshold value.

8. A face feature point detection method, comprising:
an edge calculating step creating a horizontal edge image by arranging horizontal edge values based on a pixel arrangement in the face image, each edge value indicating a luminance change in a horizontal direction, and creating a vertical edge image by arranging vertical edge values based on a pixel arrangement in the face image, each vertical edge value indicating a luminance change in a vertical direction, in a face image; and
a detection target determining step scanning the horizontal edge image and the vertical edge image, which are created by the edge calculating step with an image window, the image window including a horizontal edge window for scanning the horizontal edge image, the horizontal edge window being an aggregation of selected pixels formed in a predetermined shape corresponding to a horizontal edge of an inner corner of the eye or a horizontal edge of an outer corner of the eye, and including the vertical edge window for scanning the vertical edge image, the vertical edge window being an aggregation of selected pixels formed in a predetermined shape corresponding to a vertical edge of an eyelid, the horizontal edge windows corresponding to the inner and outer corners of the eye, being located at both sides of the vertical edge window at a level lower than the vertical edge window, the image window, configured by plural sub-windows, a constant positional relationship of which is maintained while scanning the edge image, the detection target determining step determining a position of the image window having a largest total weighted sum of total weighted sums to be a detection position where an eye, serving as a detection target, is present, providing that the total weighted sum is a total of each weighted sum in each sub-window, each weighed sum being calculated by multiplying the horizontal edge value which corresponds to each pixel in the horizontal edge window by a predetermined value defined on a per-pixel basis in the horizontal edge window and adding up all products of the horizontal edge value and the predetermined value and by multiplying the vertical edge value which corresponds to each pixel in the vertical edge window by a predetermined value defined on a per-pixel basis in the vertical edge window and adding up all products of the vertical edge value and the predetermined value.

9. A program stored on a non-transitory computer-readable medium instructing a computer to function as:

an edge calculating means creating a horizontal edge image by arranging horizontal edge values based on a pixel arrangement in the face image, each horizontal edge value indicating a luminance change in a horizontal direction, and creating a vertical edge image by arranging vertical edge values based on a pixel arrangement in the face image, each vertical edge value indicating a luminance change in a vertical direction, in the face image; and a detection target determining means scanning the horizontal edge image and the vertical edge image, which are created by the edge calculating means with an image window, the image window including a horizontal edge window for scanning the horizontal edge image, the horizontal edge window being an aggregation of selected pixels formed in a predetermined shape corresponding to a horizontal edge of an inner corner of the eye or a horizontal edge of an outer corner of the eye, and including the vertical edge window for scanning the vertical edge image, the vertical edge window being an aggregation of selected pixels formed in a predetermined shape corresponding to a vertical edge of an eyelid, the horizontal edge windows corresponding to the inner and outer corners of the eye, being located at both sides of the vertical edge window at a level lower than the vertical edge window, the image window, configured by plural sub-windows, a constant positional relationship of which is maintained between the plural sub-windows while scanning the edge image, the detection target determining means determining a position of the image window having a largest total weighted sum of total weighted sums to be a detection position where an eye, serving as a detection target, is present, providing that the total weighted sum is a total of each weighted sum in each sub-window, each weighed sum being calculated by multiplying the horizontal edge value which corresponds to each pixel in the horizontal edge window by a predetermined value defined on a per-pixel basis in the horizontal edge window and adding up all products of the horizontal edge value and the predetermined value and by multiplying the vertical edge value which corresponds to each pixel in the vertical edge window by a predetermined value defined on a per-pixel basis in the vertical edge window and adding up all products of the vertical edge value and the predetermined value.

\* \* \* \* \*